United States Patent
Tien et al.

(10) Patent No.: US 8,732,603 B2
(45) Date of Patent: May 20, 2014

(54) VISUAL DESIGNER FOR NON-LINEAR DOMAIN LOGIC

(75) Inventors: Ian Tien, Seattle, WA (US); Corey Hulen, Sammamish, WA (US); Chen-I Lim, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1279 days.

(21) Appl. No.: 11/636,848

(22) Filed: Dec. 11, 2006

(65) Prior Publication Data

US 2008/0168376 A1 Jul. 10, 2008

(51) Int. Cl.
| G06F 17/30 | (2006.01) |
| G06F 9/44 | (2006.01) |
| G06F 9/46 | (2006.01) |
| G06F 15/18 | (2006.01) |
| G06Q 10/06 | (2012.01) |
| G06Q 10/04 | (2012.01) |

(52) U.S. Cl.
CPC ...... *G06Q 10/06375* (2013.01); *G06Q 10/0639* (2013.01); *G06Q 10/04* (2013.01); *G06Q 10/06* (2013.01)
USPC .......................... 715/772; 705/26.1; 705/7.29

(58) Field of Classification Search
USPC ......................................... 715/772; 705/26.1
See application file for complete search history.

(56) References Cited

U.S. PATENT DOCUMENTS

| 6,012,044 | A * | 1/2000 | Maggioncalda et al. ... 705/36 R |
| 6,343,275 | B1 * | 1/2002 | Wong .......................... 705/26.1 |
| 6,782,421 | B1 * | 8/2004 | Soles et al. ..................... 709/223 |
| 6,983,227 | B1 | 1/2006 | Thalhammer-Reyero |
| 6,995,768 | B2 | 2/2006 | Jou et al. |
| 7,206,751 | B2 * | 4/2007 | Hack et al. ......................... 705/7 |
| 7,349,862 | B2 * | 3/2008 | Palmer et al. ................ 705/7.29 |
| 7,698,129 | B2 * | 4/2010 | Adachi et al. ...................... 704/9 |
| 7,877,308 | B1 * | 1/2011 | Padgette et al. ................. 705/35 |
| 8,498,928 | B2 * | 7/2013 | Padgette et al. ................. 705/38 |
| 2002/0169658 | A1 * | 11/2002 | Adler .............................. 705/10 |
| 2003/0061132 | A1 * | 3/2003 | Yu et al. .......................... 705/30 |
| 2003/0061246 | A1 * | 3/2003 | Bowman et al. ............. 707/204 |
| 2003/0069773 | A1 * | 4/2003 | Hladik et al. ..................... 705/7 |
| 2003/0149613 | A1 | 8/2003 | Cohen et al. |
| 2004/0138935 | A1 | 7/2004 | Johnson et al. |
| 2004/0138936 | A1 * | 7/2004 | Johnson et al. ................... 705/7 |
| 2005/0071737 | A1 | 3/2005 | Adendorff et al. |
| 2006/0010264 | A1 * | 1/2006 | Rader et al. ..................... 710/23 |
| 2006/0085434 | A1 | 4/2006 | Mah et al. |
| 2006/0112123 | A1 | 5/2006 | Clark et al. |

(Continued)

OTHER PUBLICATIONS

"Pentaho Dashboards", Date: Oct. 17, 2006, http://www.pentaho.org/docs/pentaho_dashboards.pdf.

(Continued)

*Primary Examiner* — Jordany Nunez
(74) *Attorney, Agent, or Firm* — Thomas Wong; Leonard Smith; Micky Minhas

(57) ABSTRACT

User interface that enables a user to manipulate visual representations of non-linear business logic to define and run data-centric "what-if" simulations. The visual interface models non-linear calculations based on the mapping of an input value in a non-linear domain to a score range, which score range can be continuous or non-continuous. The interface presents variable graphical indicator representations, as well as proximity and sensitivity visualizations. Different models can be developed and tested using live data feeds and aggregated dependent data feeds. The visual interface employs recursive scoring, and facilitates collaborative interface interaction.

18 Claims, 16 Drawing Sheets

(56) References Cited

U.S. PATENT DOCUMENTS

| | | |
|---|---|---|
| 2006/0229853 A1 | 10/2006 | Evans |
| 2006/0233349 A1 | 10/2006 | Cooper |
| 2007/0016542 A1* | 1/2007 | Rosauer et al. .................. 706/21 |
| 2007/0233536 A1* | 10/2007 | Johnson et al. ................... 705/7 |
| 2007/0239508 A1* | 10/2007 | Fazal et al. ........................ 705/8 |
| 2008/0189632 A1* | 8/2008 | Tien et al. ..................... 715/764 |
| 2009/0177515 A1* | 7/2009 | Redd et al. ........................ 705/8 |
| 2011/0087622 A1* | 4/2011 | Padgette et al. ............. 705/36 R |

OTHER PUBLICATIONS

"Reporting and Dashboards with Cognos 8 Business Intelligence", Date: Sep. 2005, http://www.cognos.com/pdfs/whitepapers/wp_reporting_and_dashboards_with_c8bi.pdf.

Ward et al., "A Framework for Visualizing the Behavior of Component-Based Software Systems", http://www.research.ibm.com/people/w/wim/oopsla2001/papers/ward.pdf.

* cited by examiner

*r* 600

| Input Value | Input Thresholds | Score Thresholds | *r* 410 |

Input Value Option: Aggregated Score ▼

Use the following as this target's input value:

- Sum of children scores
- Mean average of children scores
- Max of children scores
- Min of children scores

- Sum of descendants
- Mean average of descendants
- Max of descendants
- Min of descendants

Mean average of children scores
When this KPI is in a scorecard, take the corresponding target score for each of the KPIs immediately below for this KPI and use the mean average for this KPI's target score value

*Options for children without score*
- ⦿ Exclude child from calculation
- ○ Treat child score as zero
- ○ Flag as missing data and do not compute calculation The relationship between an input value and input thresholds determines the overall status of a given target.

| Input Value | Input Thresholds | Score Thresholds | *r* 410 |

Input Value Option: Value from this KPI ▼

Use the following as this target's input value:

- Actual or Target Value
- Variance
- Percentage variance

Actual or target value
Determine status based on value of actual or target from this KPI

*Select value to use:*

Actual ▼

The relationship between an input value and input thresholds determines the overall status of a given target.

VISUAL DESIGNER FOR NON-LINEAR DOMAIN LOGIC

BACKGROUND

Understanding business logic stored in calculations and programming requires specialized training that often deprives many people in the enterprise of the ability to understand the assumptions on which decisions are based. In a corporate environment where compliance has become a multi-billion dollar industry, the consequences for lack of transparency into the composition and behavior of data have largely become intolerable. Moreover, the costs and resources required to determine and monitor the "wellness" (or lack thereof) of the company can be significant. For example, metrics involved with the generation of key performance indicators (KPIs) provide a means for assembling a scorecard to assist a company in defining and measuring corporate wellness by assessing progress toward organizational as well as corporate goals.

In one complex business analysis situation the business user needs to report on the health of a company by compiling and analyzing information over four different corporate business groups (e.g., the user needs or chooses to report on finances, customers, staffing, and employee satisfaction). Financial aspects can include net income, margins, and, profitability. Customer information can include sales, repeat sales, customer satisfaction, and product pipeline (e.g., the source of the future revenue). Upstream analysis can include assessing in terms of business processes what will result in satisfied customers and that ultimately results in financial success. Staffing assessment can include how Information Technology services are performing, for example, by facilitating employee productivity by providing the tools needed to do the work efficiently, and the success or failure in meeting deadlines, for example. Upstream analysis can include employee productivity, training, job placement and attrition.

Accordingly, the general business problem is to determine how to monitor a broad array of heterogeneous metrics and accommodate all the different permutations in these metrics for measuring success. Moreover, given a system that can address this capability, it is valuable to be able to further consider "what-if" situations to address current and future scenarios. As a means to reduce costs and resources for accessing and analyzing corporate well-being, businesses desire ways in which to provide business users a quick and easy mechanism for working with complex business processes.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed innovation enables business users to manipulate visual representations associated with non-linear logic (e.g., business) and, to define and run data-centric "what-if" simulations, for example, across compound rules that aggregate and categorize data.

The innovation includes a visual user interface for modeling non-linear calculations based on the mapping of an input value in a non-linear domain to a score range, which score range can be continuous or non-continuous. The interface presents variable graphical indicator representations, as well as proximity and sensitivity visualizations. Different models can be developed and tested using live data feeds and aggregated dependent data feeds. The visual interface employs recursive scoring, and facilitates collaborative interface interaction.

Additionally, by enhancing the ability of business users across the enterprise to understand complex calculations in a visual, interactive experience, business users without the benefit of specialized training are able to collaborate in discussions about business data and provide input to decisions in beneficial ways that previously would not been possible.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 6 illustrates a screenshot of an exemplary user interface presented when a user selects the Input Value tab of the threshold pane of FIG. 5.

FIG. 7 illustrates a user interface presented when a source of an input value for the current KPI target is an actual value or target value.

FIG. 8 illustrates a screenshot of a user interface presented when a source of an input value for the current KPI target is a variance value.

FIG. 9 illustrates a screenshot of an exemplary user interface presented when a source of an input value for the current KPI target is a percentage variance value.

DETAILED DESCRIPTION

Figure 1:
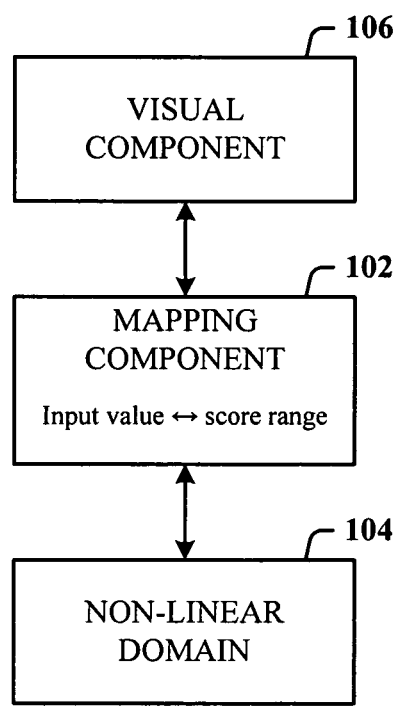
FIG. 1 illustrates a system that facilitates data interaction in a non-linear environment.

The disclosed architecture facilitates visual interaction with underlying non-linear logic by enabling a user to manipulate visual representations and to run data-centric test input value simulations that return output scores dynamically across compound rules that aggregate and categorize data. The scores can be associated with key performance indicators (KPIs) that are utilized to determine the health of a company based on current and/or projected performance, how close a company is to achieving quantifiable targets, how individuals rank against peers using different performance goals and criteria, and how to create compensation models for determining the appropriate compensation for an individual or group, for example.

The visual interface provides for the manipulation of threshold settings for the input value, and the threshold setting(s) for the output score and score ranges. In one implementation, graphical representations are colorized based on the score range and threshold values. The proximity to upper and lower threshold boundaries for score ranges is computed and presented. Threshold boundary values are configurable to be defined automatically via access to data of different data sources. Other automatic presentations via the user interface are described herein thereby enhancing the ability of employees across the enterprise to understand complex calculations in a visual and interactive way.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

Referring initially to the drawings, FIG. 1 illustrates a system 100 that facilitates data interaction in a non-linear environment. The system 100 can include a mapping component 102 for mapping an input value of a non-linear domain 104 to a score range, and a visual component 106 for generating (e.g., dynamically) an output (e.g., a score) based on the input value and presenting the output as a visual representation relative to the score range. The score range can be continuous or non-continuous.

The non-linear domain 104 can include business logic that processes business entity information across a wide spectrum of corporate business units. The non-linear domain 104 can also include compound logic where a value of a previous entity is used as an input to a following entity.

Ultimately, all performance analysis comes down to a quantitative decision about resource allocation (e.g., budget, compensation, time, future investments, . . . ). The interface presents variable graphical indicator representations, as well as proximity and sensitivity visualizations for user interaction during the quantitative analysis. Different models can be developed and tested using live data feeds and aggregated dependent data feeds. The visual interface employs recursive scoring, and facilitates collaborative interface interaction.

Figure 2:
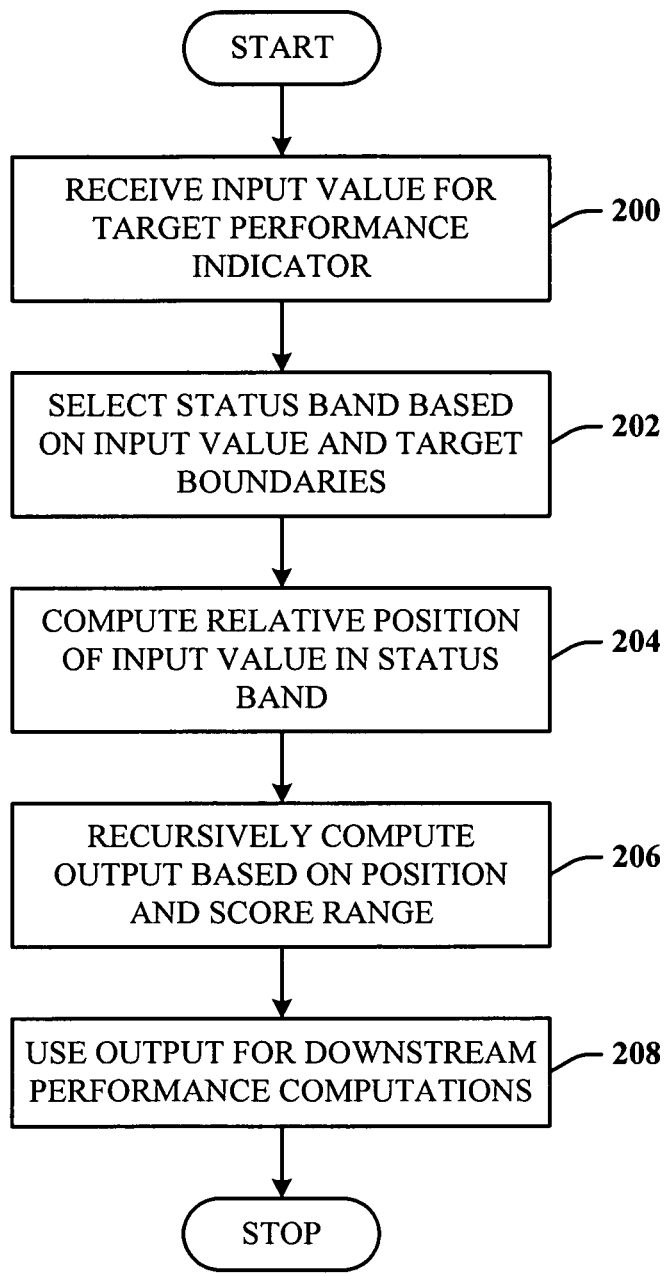
FIG. 2 illustrates a method of facilitating data interaction for scorecarding by mapping an input value to a score range.

FIG. 2 illustrates a method of facilitating data interaction for scorecarding by mapping an input value to a score range. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

The core to scoring (also referred to as "scorecarding") is the calculation of a score that represents performance across KPIs, actual data of the KPI, KPI target settings, KPI thresholds, and other constraints. Scoring exists to address many different scenarios to arrive at a measure of performance. At 200, an input value for a key performance indicator (KPI) target is received. The input can be received from a variety of data sources or be user-entered. At 202, a status band is determined and selected based on the input value and target boundaries associated with the status band. A KPI target has status bands that are defined by boundaries. Based on the boundaries and the input value, a status band is selected. Determination of the status band furthers determination of a status icon, text, and other properties to be shown in the visualization of a KPI. At 204, relative position of input value within status band is computed. This includes computing the relative distance between boundary values within the status band. At 206, an output (e.g., a score) is recursively computed, based on the relative position of the input value to the status band boundaries and the range of scores available within the status band. At 208, the output can then be used to determine performance downstream. In other words, the output (e.g., score) of one KPI can be used to inform higher levels of performance based on summaries of the base KPI.

Figure 3:
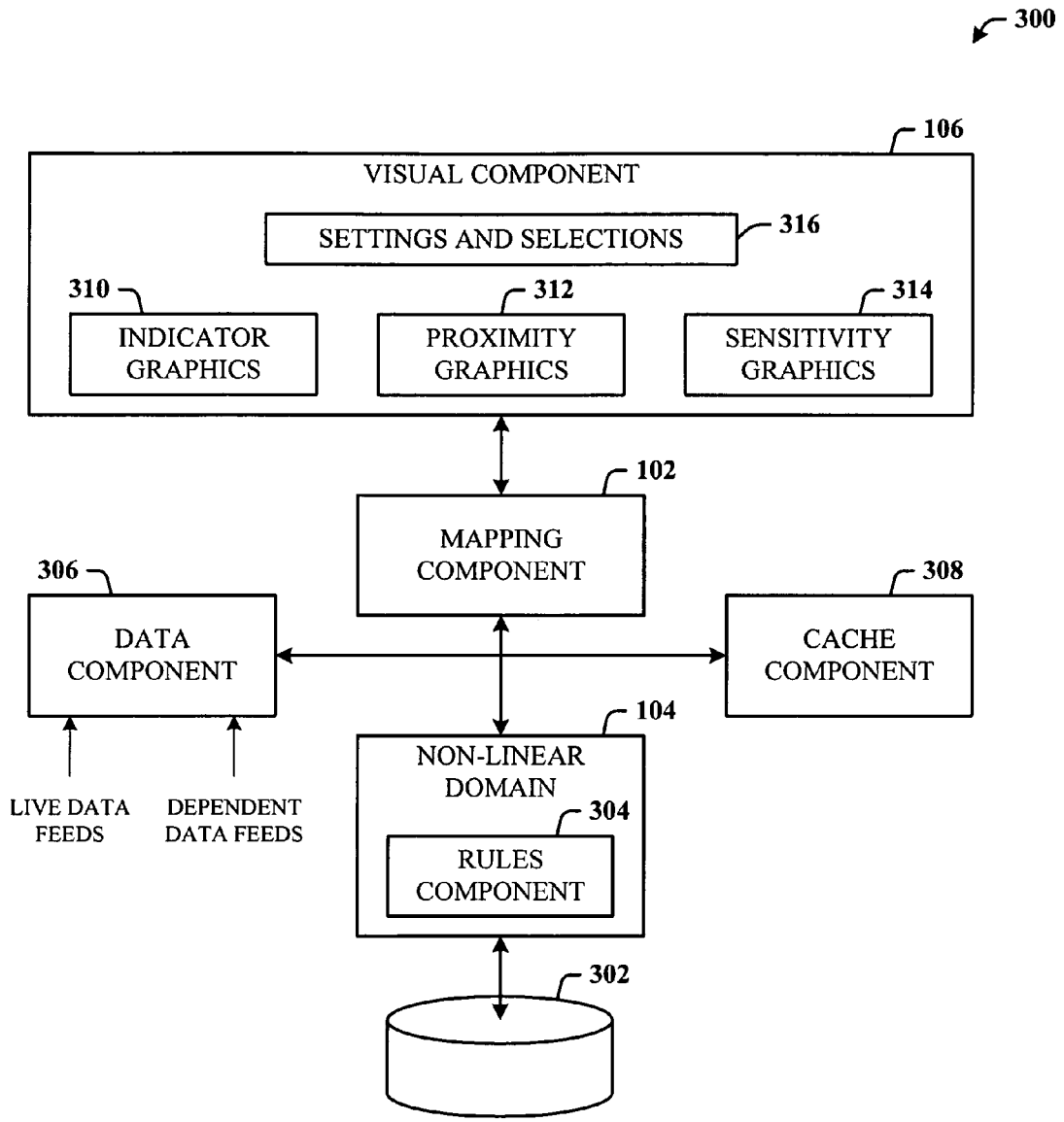
FIG. 3 illustrates an alternative system for mapping an input value to a score range in accordance with the innovation. 1

FIG. 3 illustrates an alternative system 300 for mapping an input value to a score range in accordance with the innovation. The system 300 can include the non-linear domain 104 operating on data from a data source 302. The domain 104 can include a rules component 304 that employs rules for the aggregation and categorization of the data in the data source 302. A data component 306 facilitates the receipt of live data feeds and/or dependent data feeds into the system 300. A cache component 308 facilitates caching of information and data, for example, from the data component 306, the data source 302, mapping component 102, visual component 106 and/or output from the non-linear domain 104, for example.

The visual component 106 can include the user interaction and presentation interface for allowing user and/or system configurable settings associated with, for example, indicator graphics 310, proximity graphics 312 for proximity visualization, sensitivity graphics 314 for sensitivity visualization, and other settings and selections interfaces 316.

Caching by the cache component 308 can include pre-fetching and/or pre-caching of information as a function of system state and offsets some of the inherent limitations (e.g., bandwidth, memory, processing capability, display real estate . . . ) of data sources and system components. It is to be appreciated that data deemed of low value based on software/hardware capabilities and user-related metrics can be selectively aged out of cache storage to make room for new data.

While certain ways of displaying information to users are shown and described with respect to certain figures as screenshots, those skilled in the relevant art will recognize that various other alternatives can be employed. The terms "user interface," "screen," "screenshot," "webpage," "document", and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

Figure 4:
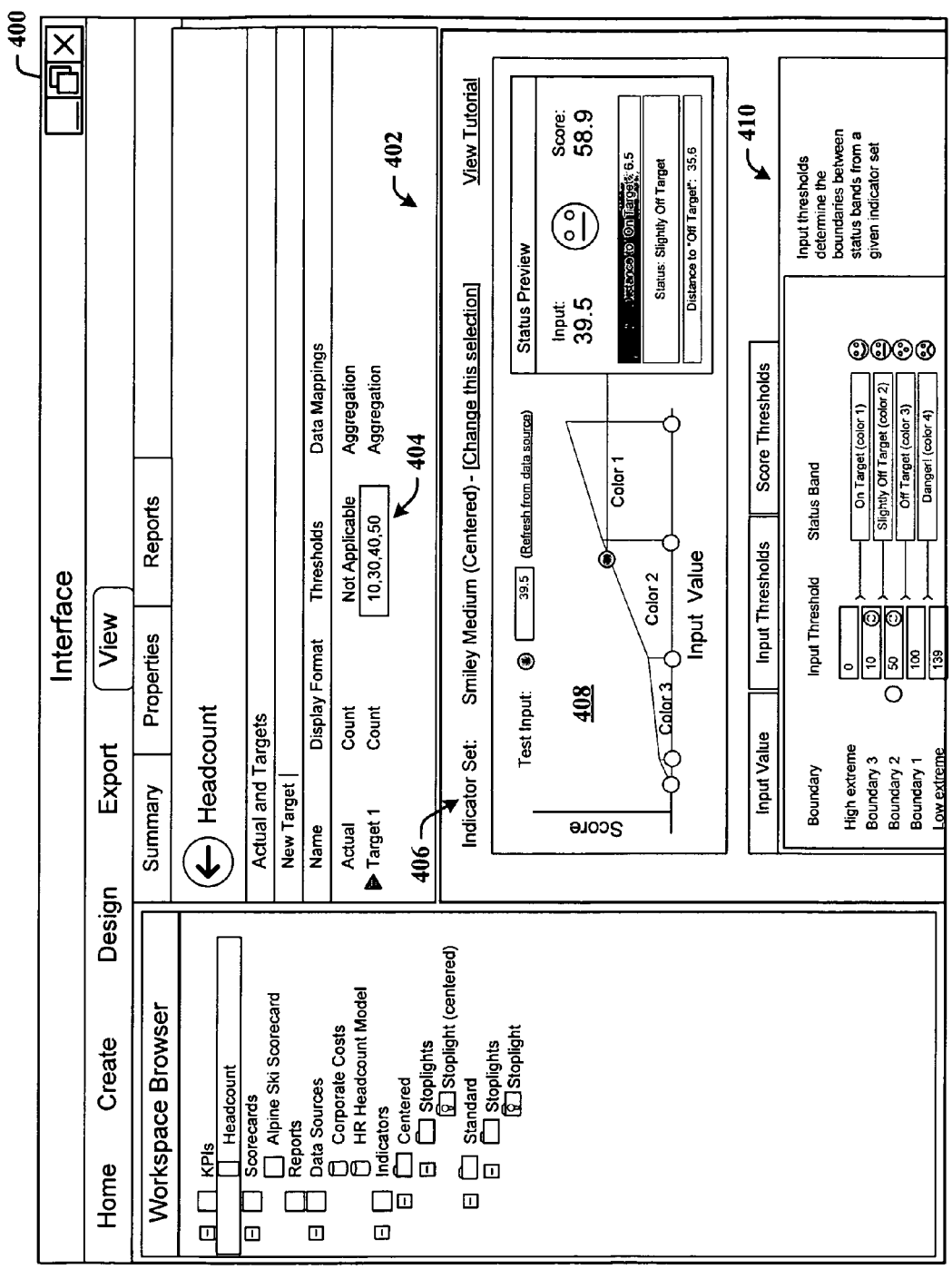
FIG. 4 illustrates a screenshot of an exemplary visual user interface for presentation and interaction with non-linear domain logic.

FIG. 4 illustrates a screenshot of an exemplary visual user interface 400 for presentation and interaction with non-linear domain logic. Here, the interface 400 facilitates user interaction with a Headcount KPI via a workspace browser by selection of a View and Summary options of the Headcount KPI. The interface 400 is presented with an editor summary pane 402 when a threshold field 404 of an actual or target object (e.g., Target 1) is selected. The summary pane 402 includes an indicator set 406 for configuring indicators, a graphing pane 408 (e.g., performance contour) for presenting a graph, and thresholds pane 410 for defining KPI status behavior. The thresholds pane 410 allows access to tabs associated with input value, input threshold settings and score threshold settings, for example.

Figure 5:
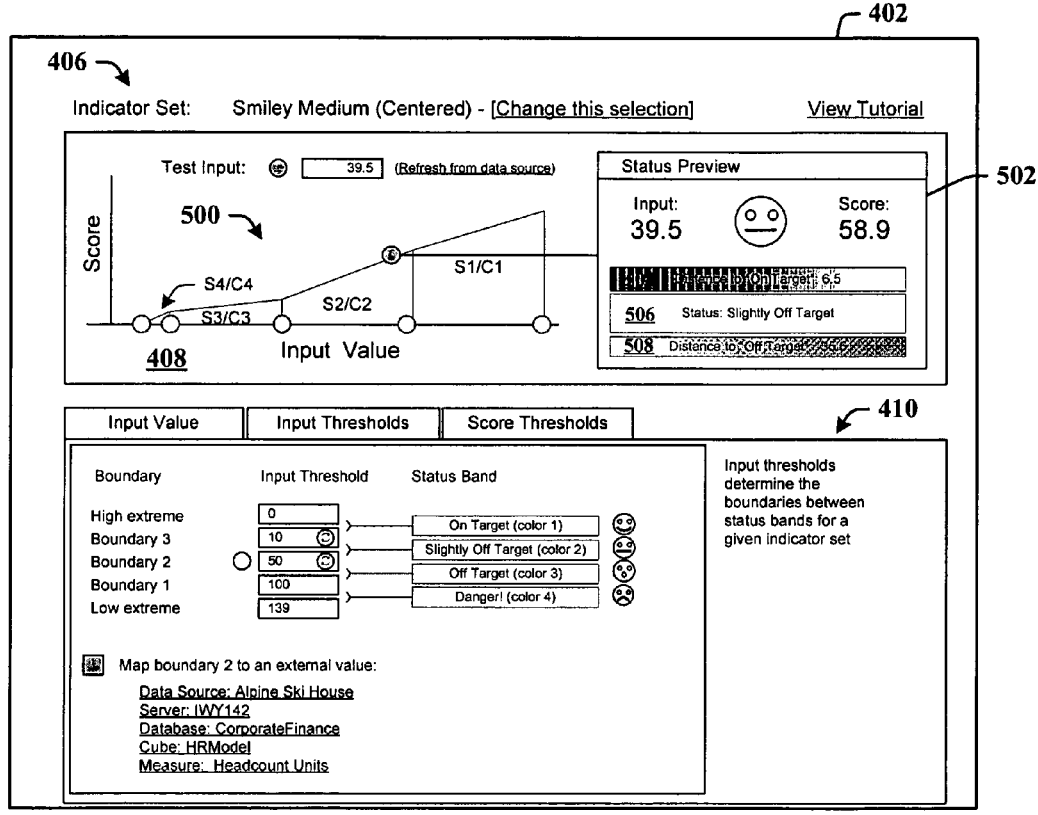
FIG. 5 illustrates a more detailed description of the summary pane of the user interface of FIG. 4.

FIG. 5 illustrates a more detailed description of the summary pane 402 of FIG. 4. The indicator set 406 includes an indicator link (denoted "Change this selection") such that selection of the link can bring up a frame content overlay (FCO) selection dialog to select a new indicator set. The FCO can be selected from a server or a workspace in support of a collaboration environment. The indicator set 406 can also include an active link to a tutorial (denoted View Tutorial) for user assistance and training.

The graphing pane 408, in this particular implementation, includes a performance contour graph 500 that shows a relationship between an input value (Input Value, across the x-axis) and a score (Score, across the y-axis). The contour graph 500 can be color-coded (or other differentiating visual indicia) using a different background color for each band within a given input range. A test input field allows a user (e.g., a business analyst) to enter a test value (e.g., 39.5), associated graphically with a grayed circle. The graphics pane 408 allows the user to conduct "what-if" scenarios by inputting sample test values and viewing in realtime the performance value (score) as generated (e.g., automatically based on manual user initiation, dynamically based on entry of new input data) by the underlying non-linear domain logic. When the user enters the test value, the interface automatically positions the corresponding grayed circle on the graph 500 thereby providing the user a quick visual representation of the test input value relative to the graph and sectional boundaries, and showing what the performance is at that given input value.

The user can interact directly with the graph 500 to cause the test input value to change rather than entering the test input value into the Test Input field. This is accomplished by the user dragging the gray circle (graphic indicia) laterally, which automatically changes the test input value of the Test Input field. The gray circle can be configured to automatically follow the contour of the graph 500. The system can then dynamically generate and present the output (e.g., a score) based on the location of the graphical indicia along the performance contour. Alternatively, the output (e.g., the score) can be generated in response to the user manually triggering calculation of the score through the non-linear logic based on the input value.

The graphing pane 408 also includes a manual refresh link (denoted "Refresh from data source") that automatically accesses the associated data source of the selected data. Selecting this link resets the test input to the input value defined for the KPI.

The vertical Score axis shows a score value scaled to a highest possible score. In some cases, this can be more than a value of one hundred. The horizontal Input Value axis shows input values scaled between the lowest and highest boundaries defined. Selecting a boundary enables the user to change the boundary position by dragging the boundary line laterally (e.g., left or right). Dragging boundaries is based on a "show curtain" restraint, in that boundaries cannot cross. In other words, dragging a boundary A from the left side of boundary B, past boundary B, will also drag boundary B to the left once the crossing is made.

On the contour graph 500, a black circle with white fill (or center) represents a selected boundary, whereas the gray circle with white fill represents an unselected boundary.

A Status Preview pane 502 of the graphing pane 408 presents the status band and score corresponding to the test input. The Input area of the preview pane 502 shows the value of the test input with appropriate formatting (or dimension) based on the display formatting settings in a KPI editor. For example, an imperial currency test input value can be entered as a test input value of 1500 and be represented in the Input area of the preview pane 502 as $1,500.

A Status image (e.g., a graphical face (or smiley face) with varying demeanor) can be displayed in the preview pane 502 to provide a quick visual feedback to the user of the output score based on the test input value. The appropriate status image based on the test input is shown here. Auto-scaling can be employed to create the correct pixel size for the status image.

Before continuing, a brief description of the contour graph settings (or parameters) is in order. In this example, the graph 500 includes four sections: a first (or "On Target") section S1 represented with a first indicia (e.g., a color (C1)), a second (or "Slightly Off Target") section S2 represented with a second indicia (e.g., a color (C2)), a third (or "Off Target") section S3 represented with a third indicia (e.g., a color (C3)), and a fourth (or "Danger") section S4 represented with a fourth indicia (e.g., a color (C4)). However, it is to be understood that more or fewer sections can be displayed according to the input thresholds (and boundaries) defined in the thresholds pane 410.

The preview pane 502 also provides a first proximity field block 504 ("Distance to") for the input value distance (e.g., 6.5) to the boundary associated with the next higher status (e.g., "On Target" of S1/C1) and the associated status title ("On Target") for the next higher status. Distance is shown in the units of the input value. The field block 504 is graphically represented with a gradient fill of the color or shading, where color or shading is employed (or other indicia gradients) in the current status (associated with color C2) in which the test input value currently resides, on the left, and the next highest status (e.g., the color C1 of the next highest level graph section S1), on the right. The description is in terms of using colors; however, other graphical techniques can be employed, for example, gray-scale shading or hatching. As the distance between the test input value and the next higher status approaches a minimum possible distance (or the test input value moves right, up the contour of section S2), the color (or indicia) of the proximity field block 504 more closely matches the color C1 of the higher status section S1. As the distance between the test input value and the next higher status approaches a maximum possible distance (or the test input value moves left, down the contour of section S2), the color of the proximity field block 504 is predominantly the color C2.

The preview pane 502 also includes a status block 506 (denoted "Status:"). The status block 506 shows the text label (e.g., "Slightly Off Target") for the current status based on the input value and background indicia (or color).

The preview pane 502 also provides a second proximity field block 508 ("Distance to") for the input value distance (e.g., −38.5) to the boundary associated with the next lower status (e.g., "Off Target" of S3/C3) and the associated status title ("Off Target") for the next lower status. Distance is shown in the units of the input value. The proximity field block 508 is graphically represented with a gradient fill of the colors (or representative indicia) in the current status (C2) in which the test input value currently resides, on the right, and the next lower status (the color C3 of the next lowest level graph section S3), on the left.

As the distance between the test input value and the next lower status approaches a minimum possible distance (or the test input value moves left, down the contour of section S2), the color of the proximity field block 508 more closely matches the color C3 of the lower status section S3. As the distance between the test input value and the next lower status approaches a maximum possible distance (or the test input value moves right, up the contour of section S2), the color of the proximity field block 508 is predominantly the color C2.

The summary pane 402 also includes the thresholds pane 410. Threshold tabs (denoted Input Value, Input Thresholds, and Score Thresholds) are arranged in causal order from left to right. Changing the input value in the graphing pane 408 will change the input thresholds, and changing the input thresholds will change the score thresholds. In one implementation, a thresholds editor opens to the Input Thresholds tab by default. If the tab selection is changed, the change persists for the duration of the client session. The next time the client is started, the Input Thresholds tab will open by default. It can be anticipated that the thresholds pane 410 will be used often, whereas the other tabs are interacted with less frequently.

The boundary values (e.g., High Extreme, Boundary 1, . . . ) are automatically labeled based on the number of status bands used in the indicator set 406. High Extreme can be the highest boundary and Low Extreme, the lowest boundary. Boundaries can then be numbered based on the number of bands. In one implementation, higher boundary numbers correspond to higher input values and lower boundary number correspond to lower input values. In an alternative implementation, lower boundary numbers correspond to higher input values and higher boundary number correspond to lower input values.

Changing the value of an input threshold automatically updates the above performance contour 500. If an input threshold has focus and is ready to receive data, a slider (gray circle with white fill along the horizontal axis) in the performance contour 500 is enabled for sliding. Similarly, if the slider in the graphing pane 408 has focus, the corresponding threshold value in the threshold fields is updated automatically. When an input threshold (e.g., the field associated with Boundary 2) is selected, an icon (e.g., a black circle with white fill) appears next to the input threshold field similar to the icon shown in the performance contour.

The status bands (denoted Status Band) display the background color, foreground color, and text for a status band along with its image. Visual indicators (e.g., grey lines and triages) show that the input thresholds bound the status bands. For example, the On Target status band spans from the High Extreme boundary to the Boundary 3 boundary, as indicated by the grey line and triage between the corresponding input threshold fields and the status band. Here, the user has selected the Boundary 2 boundary, as indicated by the black circle with white fill proximate the corresponding input threshold field. This automatically places a similar icon on the contour graph 500 at the same boundary location on the horizontal axis.

Optionally, each input threshold can be mapped to a data source. Since Boundary 2 was selected, the selection appears in the lower area of the threshold pane 410. For example, the user can map the Boundary 2 can be mapped to an external value obtained from an data source (Alpine Ski House), a server (IWY142), a database (CorporateFinance), a cube (HRModel) or a measure (Headcount Units).

A checkbox option to map a given boundary value to an external value can be made to appear for each boundary value (e.g., Boundary 1, Low Extreme). When the checkbox is checked, a pop-up appears prompting the user to specify a data source. A refresh button can be provided in one or more of the input threshold fields (e.g., fields with values 10 and 50) that enables the user to query the assigned data source for the latest number.

FIG. 6 illustrates a screenshot of an exemplary user interface 600 presented when a user selects the Input Value tab of the threshold pane 410 of FIG. 5. The Input Value tab is used to access the interface for defining from where the input value data should be obtained. The pane 410 includes an Input Value Option drop down menu. One selection is Aggregated Score. Using this option, an input value will be based on the scores of the KPIs placed below it in a given scorecard. This option can be used to recreate the "Averaged Weighted Rollup" calculation in a business scorecard manager (BSM) as well as other aggregations.

Selections for the Aggregated Score option include the following with accompanying description. When the user selects the target value input, a description can be presented that assists the user in understand the selection.

Sum of children scores. Description: When this KPI is in a scorecard, take the corresponding target score for each of the KPIs immediately below this KPI and use the sum for this KPI input value. For example, with respect to sales compensation, points can be awarded in selling across different products, but no penalties would apply for underselling on stretch goals. For comparison scoring, product performance can be measured against a set of criteria and the sum totals compared.

Mean average of children scores. Description: When this KPI is in a scorecard, take the corresponding target score for each of the KPIs immediately below this KPI and use the mean average for this KPI input value. For example, comparing different metrics such as customer satisfaction survey rating (e.g., a scale of 0 to 7), the number of product defects (defects per thousand), and gross sales (tens of thousands of dollars), in a score that is representative of how each performed against its own criteria. This can also be used to reproduce the average weighted score calculation.

Max of children scores. Description: When this KPI is in a scorecard, take the corresponding target score for each of the KPIs immediately below this KPI and use the maximum for this KPI input value. For example, with respect to research discoveries, creating a product that scores high across all objectives in a given research effort can serve as a proxy for the investments made for the entire effort.

Min of children scores. Description: When this KPI is in a scorecard, take the corresponding target score for each of the KPIs immediately below this KPI and use the minimum for this KPI input value. With respect to monitoring group performance, associating the performance of a business with that of the business peers in a group can help reduce counterproductive intra-group competition. For example, in one year, a corporation found that revenues varied greatly among stores in the same sales district when the revenues were based on specific performance. The next year when compensation of individual stores in a region was tied to the lowest performing store in that region the margin narrowed and underperformers were helped by the business peers.

Sum of descendant scores. Description: When this KPI is in a scorecard, take the corresponding target score for each of the KPIs below this KPI, regardless of depth, and use the sum for this KPI input value.

Mean average of descendant scores. Description: When this KPI is in a scorecard, take the corresponding target score for each of the KPIs below this KPI, regardless of depth, and use the mean average for this KPI input value.

Max of descendant scores. Description: When this KPI is in a scorecard, take the corresponding target score for each of the KPIs below this KPI, regardless of depth, and use the maximum for this KPI input value.

Min of descendant scores. Description: When this KPI is in a scorecard, take the corresponding target score for each of the KPIs below this KPI, regardless of depth, and use the minimum for this KPI input value.

The Aggregated Score input value option also addresses calculations when children KPIs are missing a score by causing to be presented a corresponding options section. Once the Aggregated Score option is selected, three options are made available as to how to account for missing data in subordinate KPIs. A child KPI missing data can be ignored for the purposes of the aggregate scoring calculation by selecting an "Exclude children from calculation" option. A child KPI missing data can be treated as a zero value for the purposes of the aggregate scoring calculation by selecting a "Treat children as zero" option. A child missing data will cause the aggregation to fail and yield an error message in the rendering by selecting a "Flag as missing data and do not compute" option.

FIG. 7 illustrates a user interface 700 presented when a source of an input value for the current KPI target is an actual or target value. By selecting a "Value from this KPI" option of the threshold pane 410 via the Input Value Option field, the user is allowed to select values of the current KPI. The source or input value of the target KPI value can be an actual or target value. Additionally, a drop-down menu is provided whereby the user can select an actual value to use or a target value to use.

Figures 8, 9:
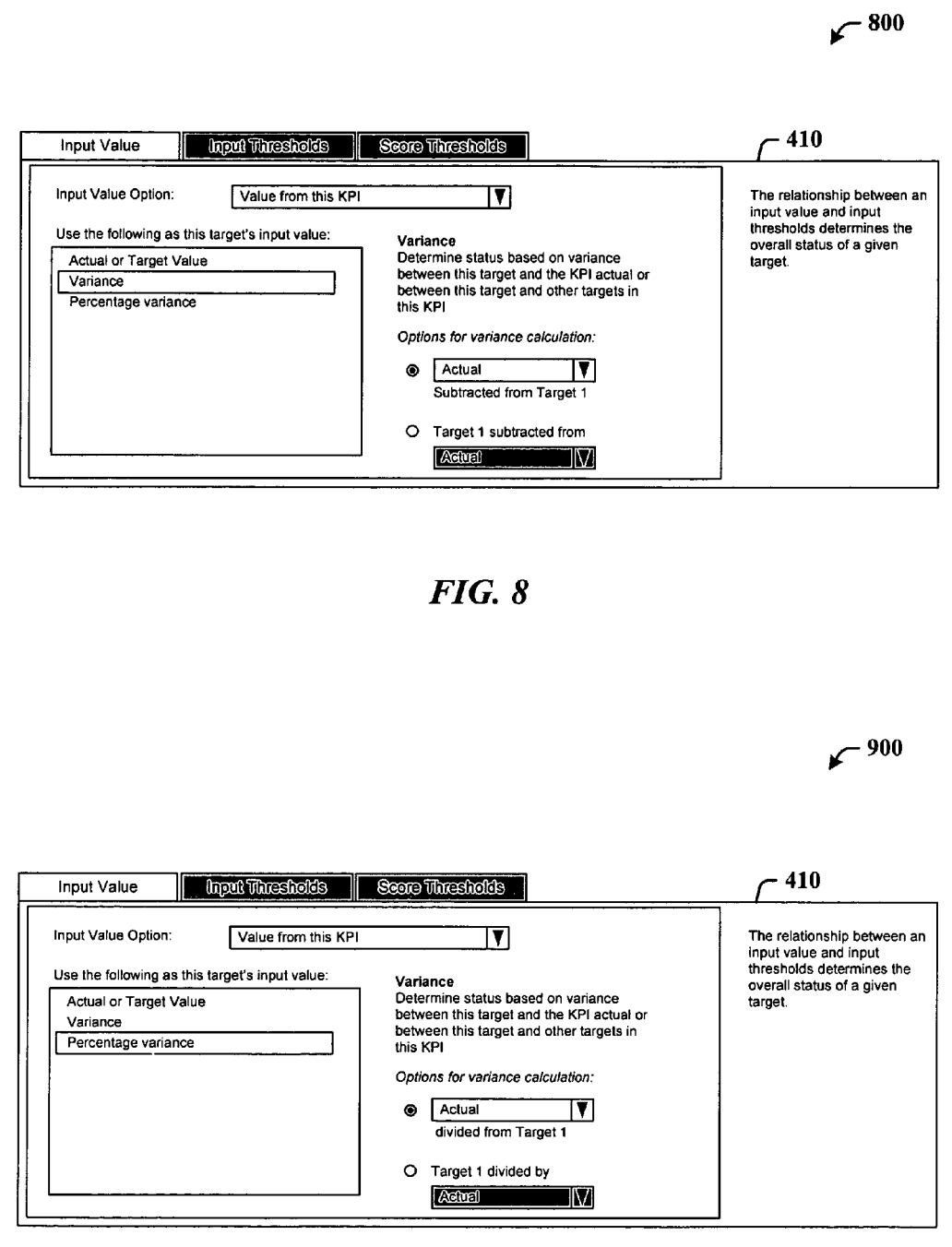

FIG. 8 illustrates a screenshot of a user interface 800 presented when a source of an input value for the current KPI target is a variance value. By selecting a "Value from this KPI" option of the threshold pane 410 via the Input Value Option field, the source for the current target KPI input value can also be selected as a variance, where the variance is the difference between an actual value and this target can be used as an input value. A positive or negative sign in front of the variance can change based on customer needs. For example, when moving toward a sales goal, actual-target can be the appropriate calculation to show the shortfall if the sales goal is not met. In another scenario, by monitoring the percent of completion of a project, a target-actual calculation can be more appropriate to represent the remaining work. Just as the actual value can be compared with this target, so can other target values. Options for variance calculation are also provided. For example, the actual value can be subtracted from the first target. Alternatively, the first target can be subtracted from the actual value.

FIG. 9 illustrates a screenshot of an exemplary user interface 900 presented when a source of an input value for the current KPI target is a percentage variance value. By selecting a "Value from this KPI" option of the threshold pane 410 via the Input Value Option field, the source for the current target KPI input value can also be selected as a percentage variance. Options for variance calculation are also provided. For example, the actual value can be divided by the first target. Alternatively, the first target can be divided by the actual value.

Figure 10:
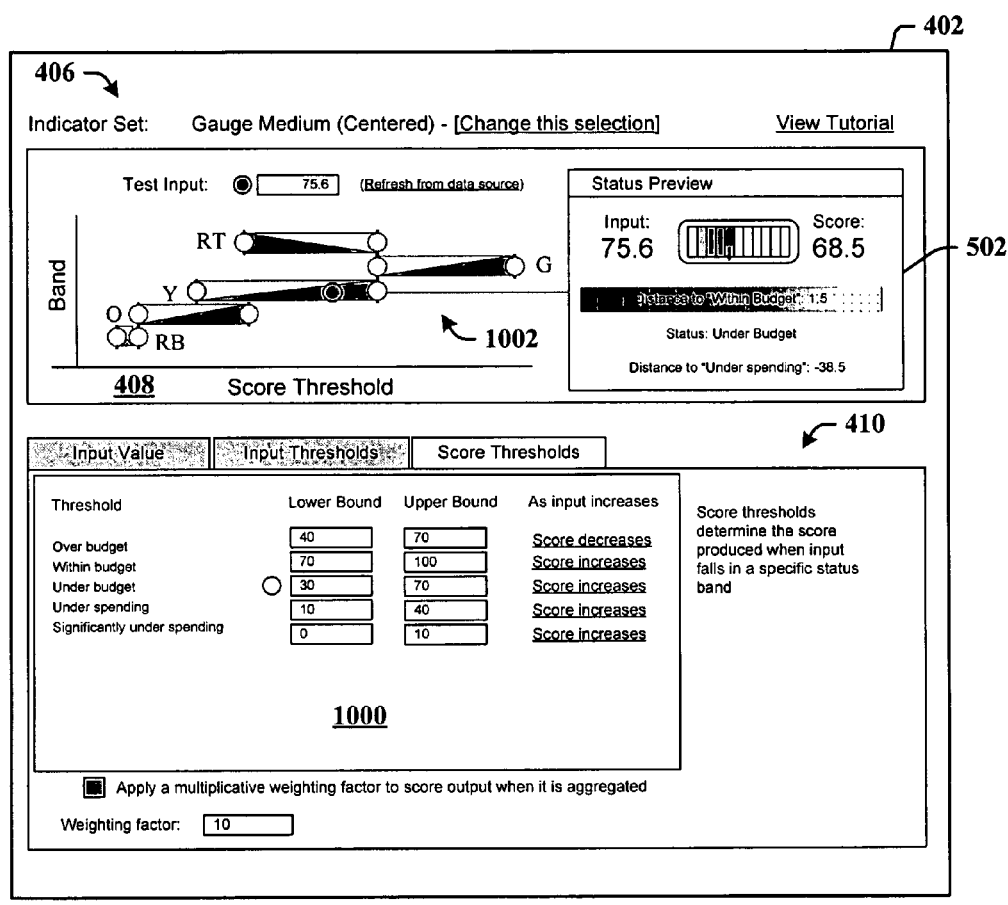
FIG. 10 illustrates a screenshot of an exemplary alternative summary pane for score threshold processing in accordance with the innovation.

FIG. 10 illustrates a screenshot of an exemplary alternative summary pane for score threshold processing in accordance with the innovation. The summary pane 402 includes the indicator set 406 and threshold pane 410 shown in the previous summary pane 402 of FIG. 4. When the Score Thresholds tab of the threshold pane 410 is selected, threshold information is presented in a threshold pane 1000 in support of a threshold graph 1002 in the graphing pane 408 being automatically presented.

The graph 1002 illustrates multiple bands on the vertical axis against score thresholds on the horizontal axis. Here, five status bands (or score ranges) are shown each employing definitive graphical indications (e.g., different colors). Consider colors for each of the bands (from bottom to top) of red (denoted RB for red on bottom), orange (O), yellow (Y), green (G), and then red on top (denoted RT for red on top). Thinking of the horizontal axis as a measure of goodness, as a value changes from red (RB) to orange O to yellow Y, movement is more to the right. This can mean that the threshold score is increasing, with the green band G the highest value to the right.

Note that the top red band (RT) is further to the left than the green band G. This can mean that if looking at a budget, if budget spending is within budget, as indicated in the threshold setting in the threshold pane 1000, than the score is in the green band G. However, as soon as activity is in an over budget situation, activity is in the top red band RT.

Each of the bands includes triangle pairs that grow left to right in the bottom four bands (RB, O, Y and G), and in the opposite direction in the top band RT. This represents the gradient of the input value. As the test input value increases, the score increases in a certain direction. Notice that the gradient fill in the top band RT is inverted. Accordingly, when in the top band RT and the budget is, for example, one dollar over, then the system is only a little bit red (the rightmost part of the bar), but if 100$ over, then follow gradient moving left on the horizontal bar. Note that as indicated before although reference is made to graphing colors, other types of differentiating indicia (e.g., non-color) can be utilized.

The status preview pane 502, as before, shows the input value, and the output score. Here, rather than a smiley face indicator, a gauge indicator graphic is used. Moreover, the "Distance to:" proximity visualizations and "Status" graphics are shown for Within Budget/Under Spending and Under Budget, respectively.

The score thresholds tab of the thresholds pane 410 can also include a weighting field for entering and applying a weighting factor to the score output when, for example, the score output is aggregated.

Figure 11:
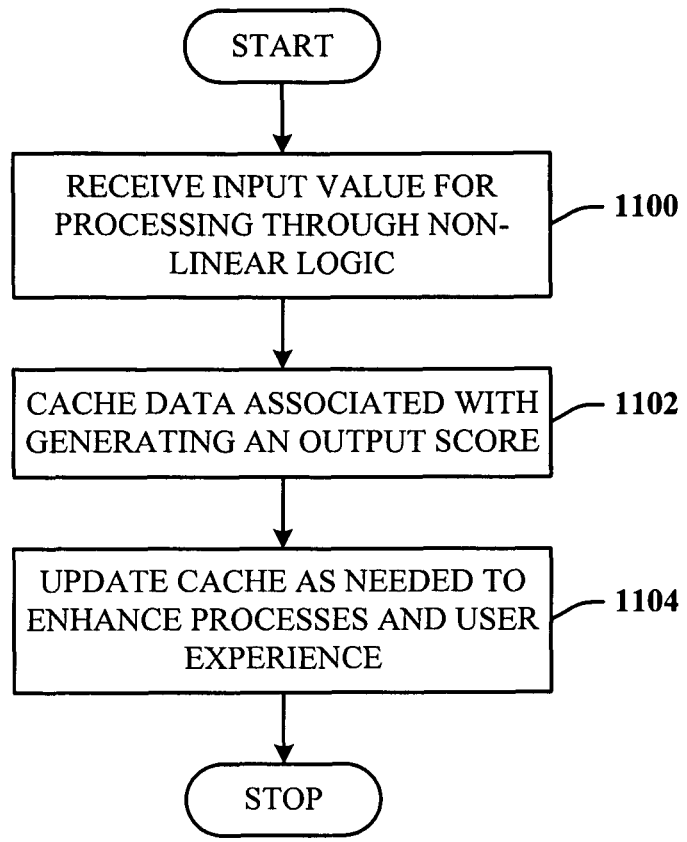
FIG. 11 illustrates a method of caching data for enhancing system processes and user experience.

FIG. 11 illustrates a method of caching data for enhancing system processes and user experience. At 1100, an input value is received for processing through non-linear domain logic. At 1102, data associated with generating an output score is cached. This can include prefetching and/or pre-caching operations. At 1104, the cache is updated, as needed, to enhance system processes and user experience. This includes aging out stale cache data, for example.

Figure 12:
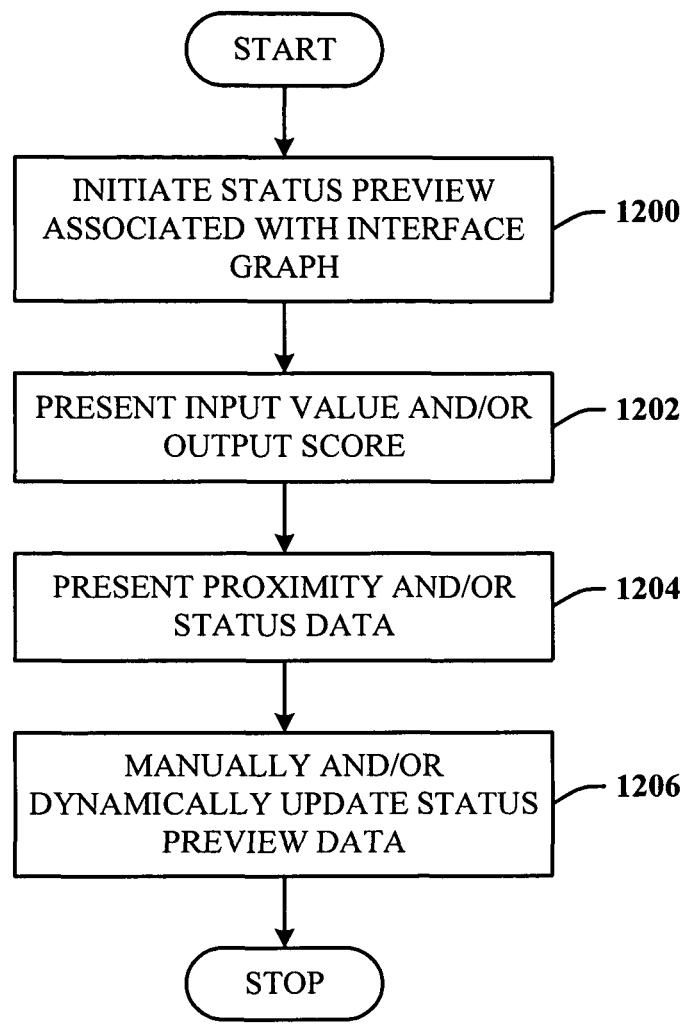
FIG. 12 illustrates a method of providing a status preview function in the user interface.

FIG. 12 illustrates a method of providing a status preview function in the user interface. At 1200, a status preview pane is generated and presented in association with an interface graph. At 1202, an input value and/or output score is presented via the status preview pane. At 1204, proximity and/or status data is presented via the preview pane. At 1206, the status preview data is manually and/or automatically updated for presentation. Information presented in the status preview pane can be dynamically computed and presented based on user manipulated changes to the associated graphing pane. For example, dragging an icon along the contour of the performance contour graph causes realtime updating of the information in the status preview pane.

Figure 13:
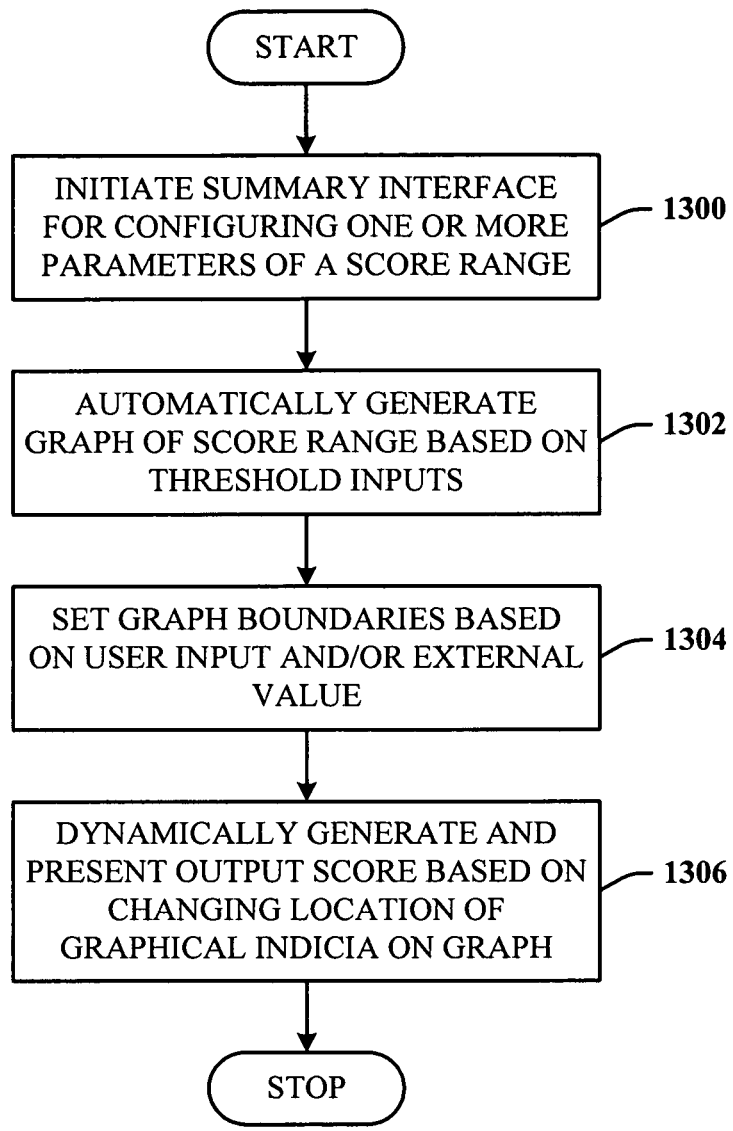
FIG. 13 illustrates a method of interacting to effect an output score range.

FIG. 13 illustrates a method of interacting with visual information to effect an output score range. At 1300, a summary interface is presented for configuring one or more parameters of a score range. At 1302, a graph of one or more score ranges is automatically generated based on threshold input values. At 1304, graph boundaries of score ranges are configured and presented based on user input and/or external value inputs. At 1306, the output score is dynamically generated and presented based on changing location of graphical indicia on graph score ranges.

Figure 14:
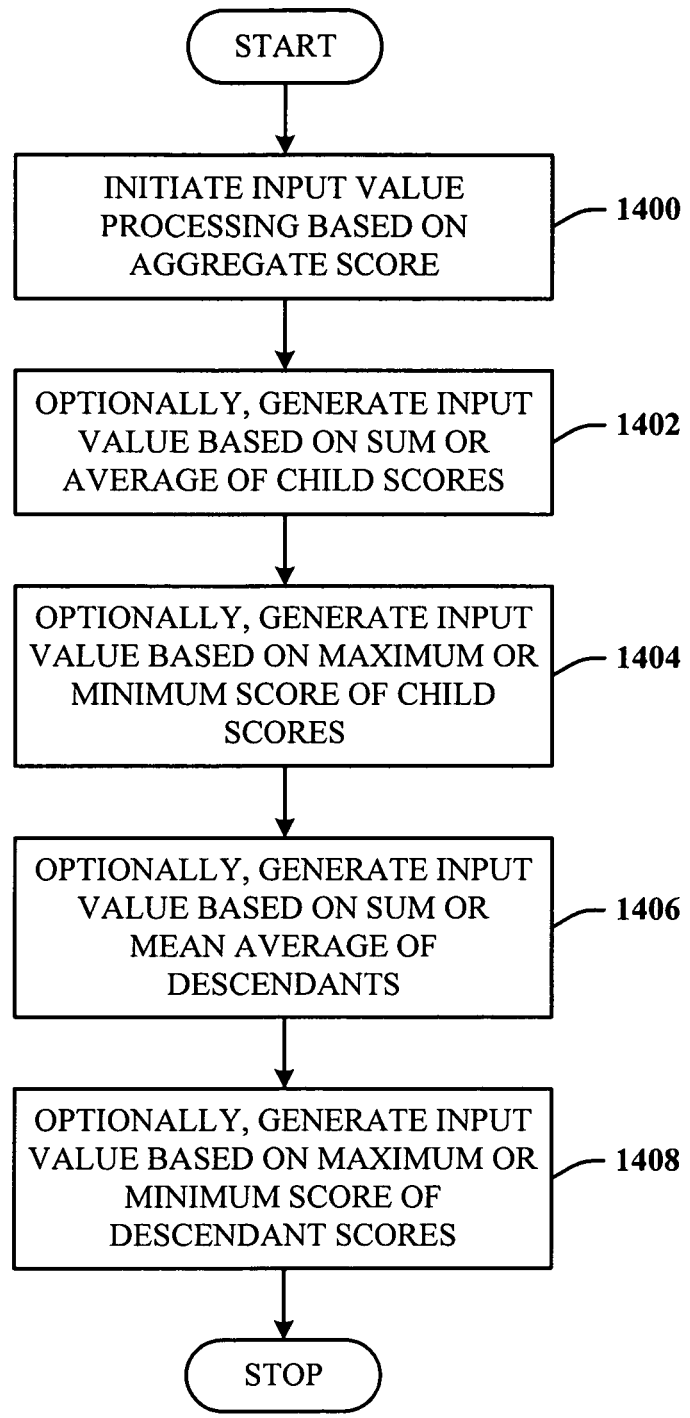
FIG. 14 illustrates a method of processing aggregate data for input value processing.

FIG. 14 illustrates a method of processing aggregate data for input value processing. At 1400, input value processing is initiated based on aggregate score inputs. At 1402, optionally, the input value is generated based on a sum of child scores or average of child scores. At 1404, optionally, the input value is generated based on a maximum score of available child scores or a minimum score of the available child scores. At 1406, optionally, the input value is generated based on a sum of descendant scores or an average of the descendant scores. At 1408, optionally, the input value is generated based on a maximum descendant score or a minimum descendant score.

Figure 15:
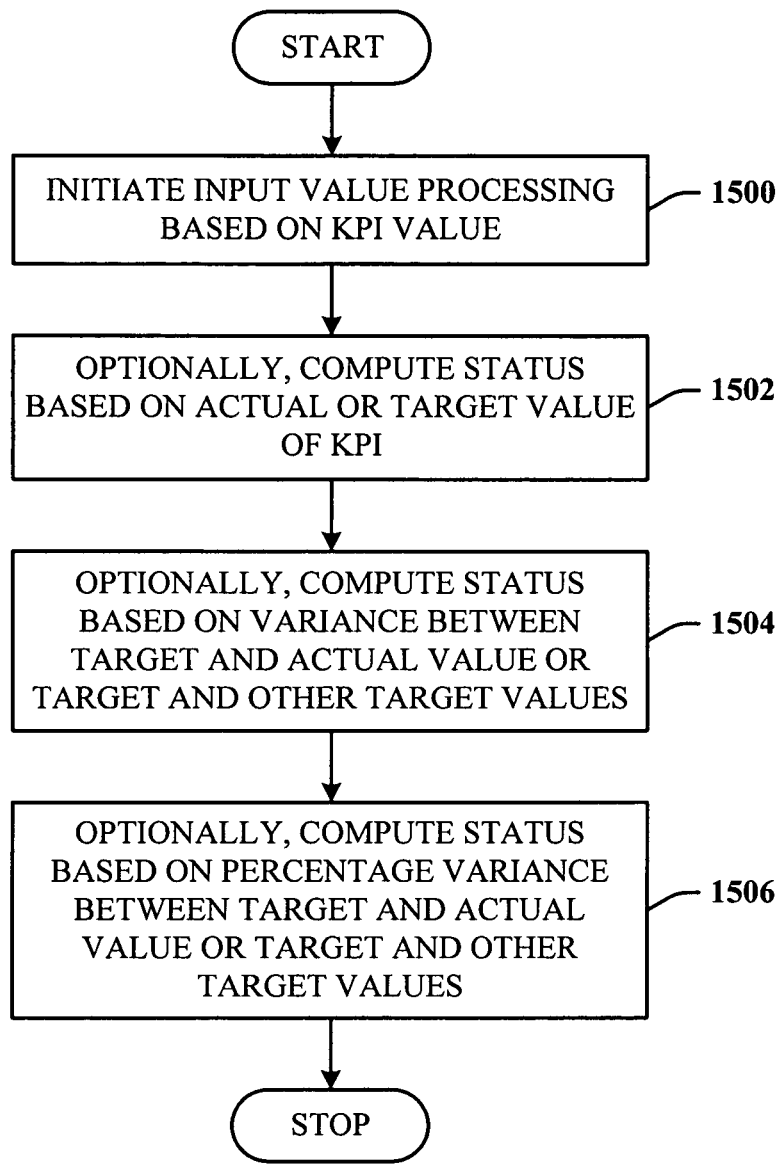
FIG. 15 illustrates a method of processing an input value based on a KPI value.

FIG. 15 illustrates a method of processing an input value based on a KPI value. At 1500, input value processing is initiated based in a KPI value. At 1502, optionally, the status is computed based on an actual value of the KPI or a target value of the KPI. At 1504, optionally, the status is computed based on a variance between a target value and an actual value, or a target value and other target values. At 1506, optionally, the status is computed based on a percentage variance between a target value and an actual value, or a target value and other target values.

Figure 16:
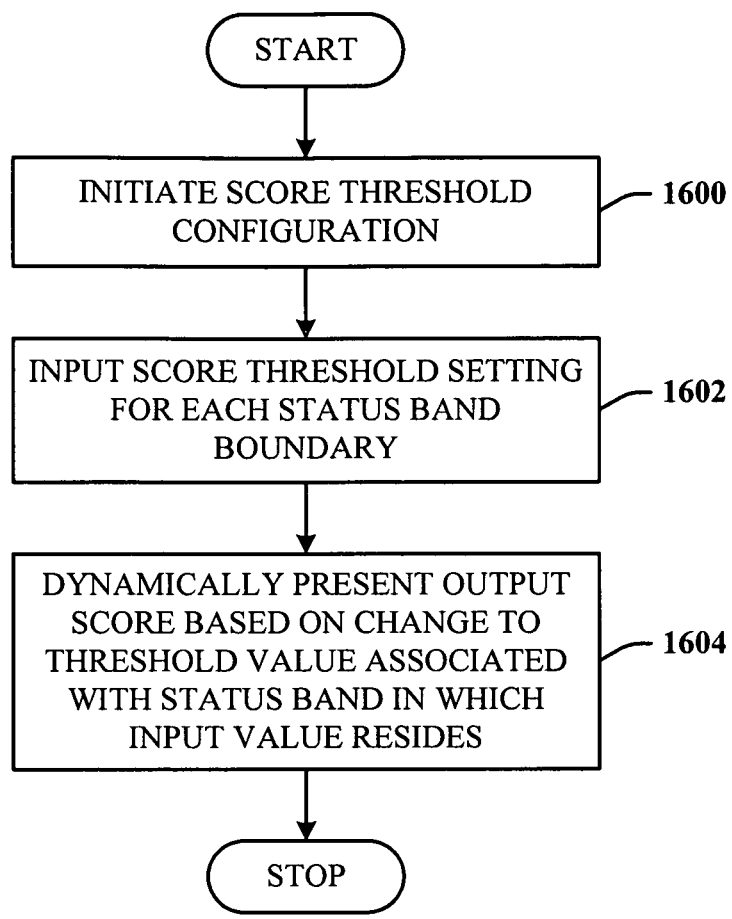
FIG. 16 illustrates a method of configuring threshold values for score processing.

FIG. 16 illustrates a method of configuring threshold values for score processing. At 1600, threshold configuration processing is initiated. At 1602, threshold score settings are input for one or more of the status band boundaries. At 1604, an output score is dynamically presented based on a change to a threshold value associated with a status band in which the input value resides or is associated.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 17:
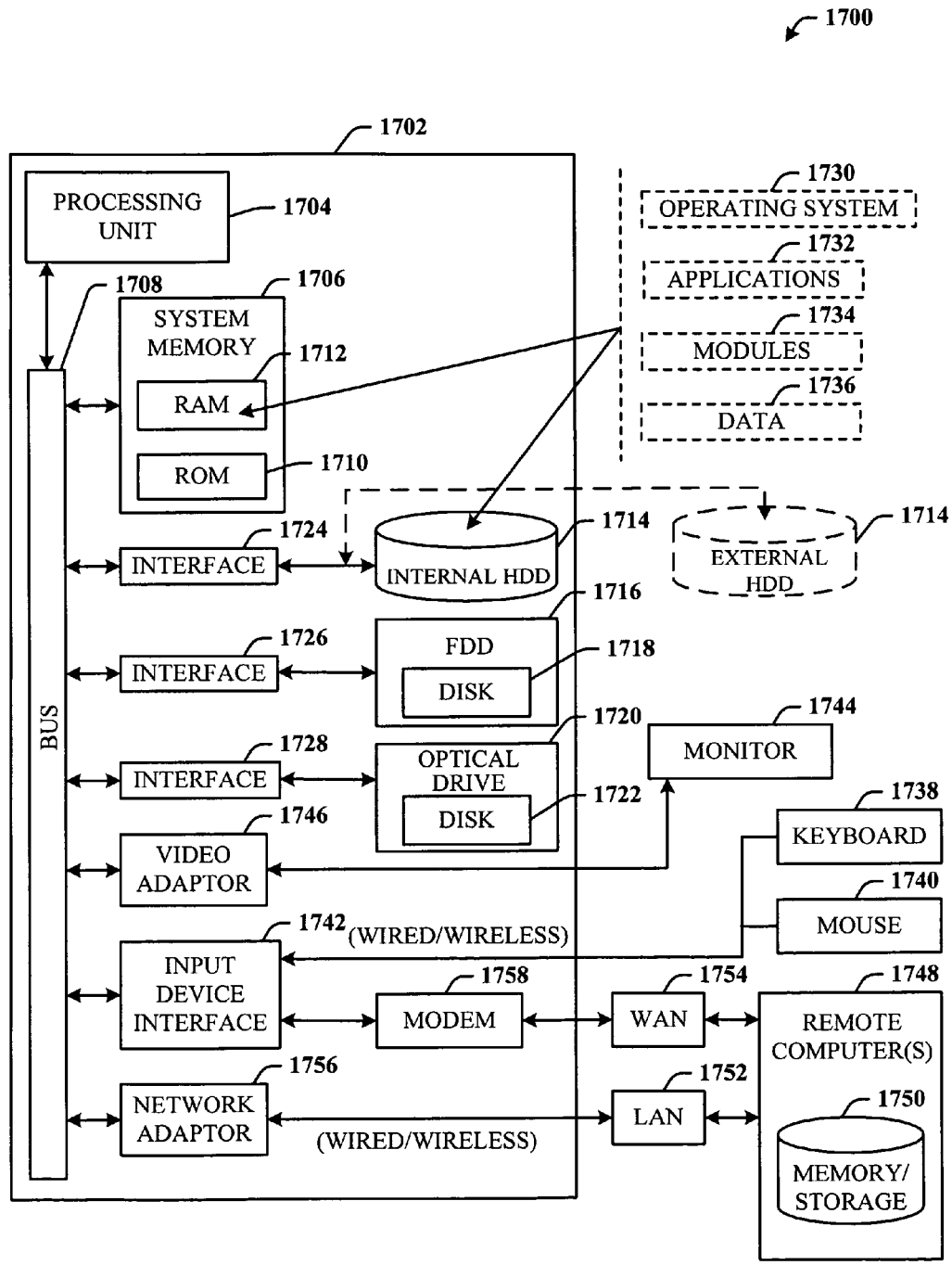
FIG. 17 illustrates a block diagram of a computing system operable to execute the disclosed visual designer architecture.

Referring now to FIG. 17, there is illustrated a block diagram of a computing system 1700 operable to execute the disclosed visual designer architecture. In order to provide additional context for various aspects thereof, FIG. 17 and the following discussion are intended to provide a brief, general description of a suitable computing system 1700 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 17, the exemplary computing system 1700 for implementing various aspects includes a computer 1702, the computer 1702 including a processing unit 1704, a system memory 1706 and a system bus 1708. The system bus 1708 provides an interface for system components including, but not limited to, the system memory 1706 to the processing unit 1704. The processing unit 1704 can be any of various commercially available processors. Dual microprocessors and other multi-processor architectures may also be employed as the processing unit 1704.

The system bus 1708 can be any of several types of bus structure that may further interconnect to a memory bus (with or without a memory controller), a peripheral bus, and a local bus using any of a variety of commercially available bus architectures. The system memory 1706 includes read-only memory (ROM) 1710 and random access memory (RAM) 1712. A basic input/output system (BIOS) is stored in a non-volatile memory 1710 such as ROM, EPROM, EEPROM, which BIOS contains the basic routines that help to transfer information between elements within the computer 1702, such as during start-up. The RAM 1712 can also include a high-speed RAM such as static RAM for caching data.

The computer 1702 further includes an internal hard disk drive (HDD) 1714 (e.g., EIDE, SATA), which internal hard disk drive 1714 may also be configured for external use in a suitable chassis (not shown), a magnetic floppy disk drive (FDD) 1716, (e.g., to read from or write to a removable diskette 1718) and an optical disk drive 1720, (e.g., reading a CD-ROM disk 1722 or, to read from or write to other high capacity optical media such as the DVD). The hard disk drive 1714, magnetic disk drive 1716 and optical disk drive 1720 can be connected to the system bus 1708 by a hard disk drive interface 1724, a magnetic disk drive interface 1726 and an optical drive interface 1728, respectively. The interface 1724 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. It is to be appreciated that the innovation can be implemented with various commercially available operating systems or combinations of operating systems. The programs 1732, program modules 1734 and program data 1736 can include the visual and mapping components (106 and 102), the non-linear domain logic 104, and other components (304, 306, 308, 310, 312, 314, and 316), for example, described herein.

A user can enter commands and information into the computer 1702 through one or more wired/wireless input devices, for example, a keyboard 1738 and a pointing device, such as a mouse 1740. Other input devices (not shown) may include a microphone, an IR remote control, a joystick, a game pad, a stylus pen, touch screen, or the like. These and other input devices are often connected to the processing unit 1704 through an input device interface 1742 that is coupled to the system bus 1708, but can be connected by other interfaces, such as a parallel port, an IEEE 1394 serial port, a game port, a USB port, an IR interface, etc.

A monitor 1744 or other type of display device is also connected to the system bus 1708 via an interface, such as a video adapter 1746. In addition to the monitor 1744, a computer typically includes other peripheral output devices (not shown), such as speakers, printers, etc.

The computer 1702 may operate in a networked environment using logical connections via wired and/or wireless communications to one or more remote computers, such as a remote computer(s) 1748. The remote computer(s) 1748 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1750 is illustrated. The logical connections depicted include wired/wireless connectivity to a local area network (LAN) 1752 and/or larger networks, for example, a wide area network (WAN) 1754. Such LAN and WAN networking environments are commonplace in offices and companies, and facilitate enterprise-wide computer networks, such as intranets, all of which may connect to a global communications network, for example, the Internet.

When used in a LAN networking environment, the computer 1702 is connected to the local network 1752 through a wired and/or wireless communication network interface or adapter 1756. The adaptor 1756 may facilitate wired or wireless communication to the LAN 1752, which may also include a wireless access point disposed thereon for communicating with the wireless adaptor 1756.

When used in a WAN networking environment, the computer 1702 can include a modem 1758, or is connected to a communications server on the WAN 1754, or has other means for establishing communications over the WAN 1754, such as by way of the Internet. The modem 1758, which can be internal or external and a wired or wireless device, is connected to the system bus 1708 via the serial port interface 1742. In a networked environment, program modules depicted relative to the computer 1702, or portions thereof, can be stored in the remote memory/storage device 1750. It will be appreciated that the network connections shown are exemplary and other means of establishing a communications link between the computers can be used.

The computer 1702 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 18:
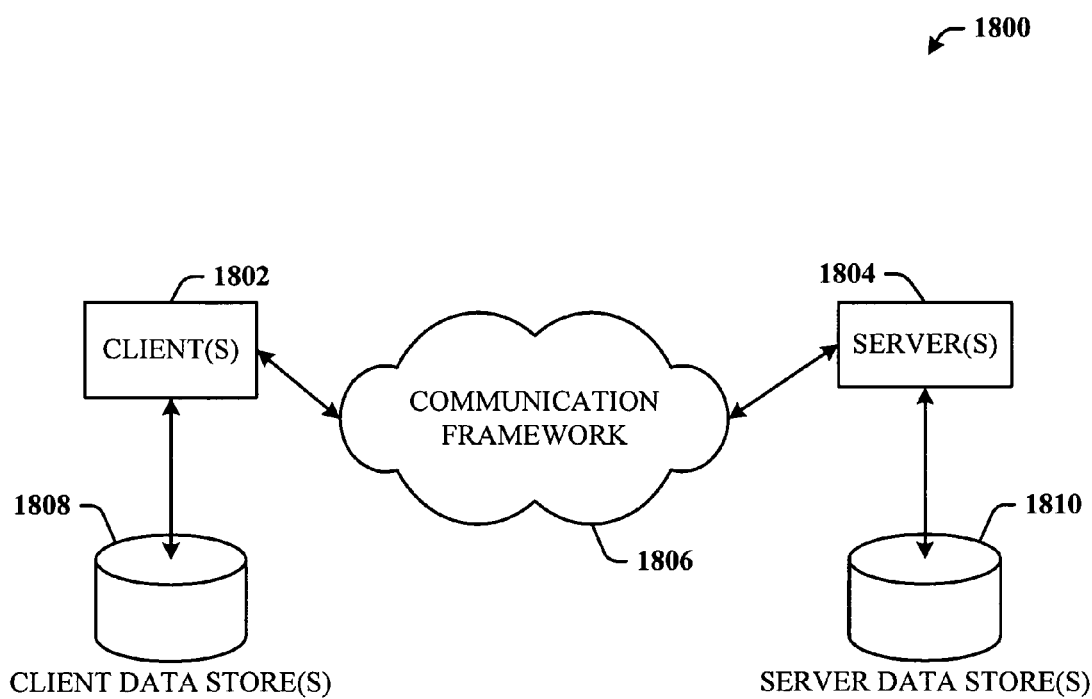
FIG. 18 illustrates a schematic block diagram of an exemplary computing environment that facilitate input value mapping to an output score range via a visual interface.

Referring now to FIG. 18, there is illustrated a schematic block diagram of an exemplary computing environment 1800 that facilitate input value mapping to an output score range via a visual interface. The system 1800 includes one or more client(s) 1802. The client(s) 1802 can be hardware and/or software (e.g., threads, processes, computing devices). The client(s) 1802 can house cookie(s) and/or associated contextual information by employing the subject innovation, for example.

The system 1800 also includes one or more server(s) 1804. The server(s) 1804 can also be hardware and/or software (e.g., threads, processes, computing devices). The servers 1804 can house threads to perform transformations by employing the architecture, for example. One possible communication between a client 1802 and a server 1804 can be in the form of a data packet adapted to be transmitted between two or more computer processes. The data packet may include a cookie and/or associated contextual information, for example. The system 1800 includes a communication framework 1806 (e.g., a global communication network such as the Internet) that can be employed to facilitate communications between the client(s) 1802 and the server(s) 1804.

Communications can be facilitated via a wired (including optical fiber) and/or wireless technology. The client(s) 1802 are operatively connected to one or more client data store(s) 1808 that can be employed to store information local to the client(s) 1802 (e.g., cookie(s) and/or associated contextual information). Similarly, the server(s) 1804 are operatively connected to one or more server data store(s) 1810 that can be employed to store information local to the servers 1804.

The server data stores 1810 and client data stores 1808 can provide the sources of data for a boundary value, for example, as described herein. The servers 1804 can facilitate a collaboration environment via which multiples user can share information and collaborate to test input values according to what-if scenarios. Alternatively, the clients 1802 can operate independently of the servers 1804 to process test input values against underlying non-linear domain logic downloaded to the client, or accessed via the servers 1804.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates data interaction, comprising:
   a processing unit;
   a memory coupled to the processing unit storing instructions that when executed implement:
   a data component receiving a data feed;
   a mapping component mapping an input value of a non-linear domain from the data feed to a score range having a first boundary smaller than the input value and a second boundary larger than the input value; and
   a visual component facilitating a collaboration environment through which multiple users can share information and collaborate to test input values according to what-if scenarios, by recursively generating, with non-linear domain logic, an output score having a value in the score range and based on the relative position of the input value between the first and second boundaries, and presenting the output score as a visual representation having a first visual indicator representing a degree of proximity to the first boundary and, a second visual indicator representing a degree of proximity to the second boundary.

2. The system of claim 1, wherein the non-linear domain includes at least one of business logic or compound logic.

3. The system of claim 1, wherein the visual component dynamically generates and presents the output.

4. The system of claim wherein the score range is based on recursive scoring.

5. The system of claim 1, wherein the visual component facilitates manipulation of a variable indicator representation.

6. The system of claim 1, wherein the visual component facilitates visualization of proximity information of the output to a boundary based on a performance target.

7. The system of claim 1, wherein the visual component facilitates visualization of sensitivity information of the output, which is a score, based on a performance target.

8. The system of claim 1, wherein the visual component generates the output based on a live data feed that includes the input value.

9. The system of claim 1, wherein the score range is continuous or non-continuous.

10. A computer-implemented method of facilitating data interaction, comprising:
    receiving an input value for generation of a target performance indicator;
    selecting, a status band having a first status band boundary smaller than the input value and a second status band boundary larger than the input value and a range of output scores based on the input value;
    computing a relative position of the input value between the first and second status band boundaries;
    facilitating a collaboration environment through which multiple users can share information and collaborate to test input values according to what-if scenarios, by:
    recursively computing, with non-linear domain logic, an output score based on the relative position of the input value to the status band boundaries and the range of output scores, available within the status band; and
    presenting the output score as a visual representation having a first visual indicator representing a degree of proximity to the first boundary and a second visual indicator representing a degree of proximity to the second boundary.

11. The method of claim 10, further comprising caching data related to dynamic creation of the output score.

12. The method of claim 10, further comprising manually updating a status preview by refreshing data from a data source.

13. The method of claim 10. further comprising dynamically processing the input value to update the output score.

14. The method of claim 10, further comprising configuring a boundary of the status band based on data from an external source.

15. The method of claim 10, further comprising receiving the input value from a dependent data feed or a live data feed.

16. The method of claim 10, further comprising performing what-if analysis by entering the input value as a test value to generate a key performance indicator as the output score.

17. The method of claim 10, further comprising dragging graphical indicia along a performance contour graph and, dynamically generating and presenting the output score in response thereto.

18. A computer-implemented system, comprising:
    computer-implemented means for receiving an input value for processing through non-linear domain logic;
    computer-implemented means for mapping the input value to a score range having a first boundary smaller than the input value and a second boundary larger than the input value;
    computer-implemented means for computing a relative position of the input value between the first and second boundaries of the score range;
    computer-implemented means for facilitating a collaboration environment through which multiple users can share information and collaborate to test input values, according to what-if scenarios, by recursively computing, with non-linear domain logic, a performance indicator having a value in the score range and based on the relative position of the input value between the boundaries of the score range; and
    computer-implemented means for presenting the performance indicator as a visual representation having a first visual indicator representing a degree of proximity to the first boundary and a second visual indicator representing a degree of proximity to the second boundary.

* * * * *